United States Patent
Hong

(10) Patent No.: US 9,071,858 B2
(45) Date of Patent: Jun. 30, 2015

(54) INTERFACING APPARATUS FOR TRANSMITTING MOVING IMAGE BETWEEN COMMUNICATION TERMINALS AND METHOD THEREOF

(75) Inventor: Woon Sig Hong, Gyeonggi-do (KR)

(73) Assignee: Woon Sig Hong, Gyeonggi-do (KR)

( * ) Notice: Subject to any disclaimer, the term of this patent is extended or adjusted under 35 U.S.C. 154(b) by 489 days.

(21) Appl. No.: 13/577,743

(22) PCT Filed: Feb. 21, 2011

(86) PCT No.: PCT/KR2011/001107
§ 371 (c)(1),
(2), (4) Date: Aug. 8, 2012

(87) PCT Pub. No.: WO2011/102682
PCT Pub. Date: Aug. 25, 2011

(65) Prior Publication Data
US 2012/0317595 A1      Dec. 13, 2012

(30) Foreign Application Priority Data
Feb. 22, 2010  (KR) ......................... 10-2010-0015551

(51) Int. Cl.
*H04N 7/16*        (2011.01)
*H04N 21/258*    (2011.01)
(Continued)

(52) U.S. Cl.
CPC ......... *H04N 21/25841* (2013.01); *H04H 20/30* (2013.01); *H04N 5/4401* (2013.01);
(Continued)

(58) Field of Classification Search
None
See application file for complete search history.

(56) References Cited

U.S. PATENT DOCUMENTS 7,151,909 B2 * 12/2006 Nishi et al. .................... 455/3.01
7,555,767 B2 *  6/2009 Takagi et al. .................... 725/23
(Continued)

FOREIGN PATENT DOCUMENTS

| KR | 10-2002-0073658 | 9/2002 | ............. G06F 17/60 |
| KR | 10-2004-0033933 | 4/2004 | ............. H04Q 7/24 |
| KR | 10-0821205      | 4/2008 | ............. H04Q 7/38 |

OTHER PUBLICATIONS

International Search Report (ISR) in PCT/KR2011/001107 dated Oct. 27, 2011.
Notice of Allowance issued in Korean Patent Application No. KR 10-2010-0015551, dated Sep. 3, 2013.

*Primary Examiner* — Jonathan V Lewis
(74) *Attorney, Agent, or Firm* — Harness, Dickey & Pierce, P.L.C.

(57) ABSTRACT

Apparatus and method for relaying moving images in real time using a communication terminal are provided. The apparatus for relaying the moving images in real time using the communication terminal includes a communication terminal of an information provider, configured to have functions of global positioning system, shooting moving images, and data transmission by accessing wireless Internet networks; a terminal of an information requester, configured to request moving images shot by the communication terminal of the information provider and receive moving image information on the shot moving images; and a relay server configured to provide a transmission program to the communication terminal of the information provider so as to track a location of the communication terminal and allow the information provider to transmit the moving image information in real time, and to control and guide, in real time, transmission of the moving image information between the communication terminal of the information provider and the terminal of the information requester.

6 Claims, 3 Drawing Sheets

(51) Int. Cl.

| | | |
|---|---|---|
| *H04H 20/30* | (2008.01) | |
| *H04N 5/44* | (2011.01) | |
| *H04N 21/61* | (2011.01) | |
| *H04N 21/414* | (2011.01) | |
| *H04H 20/57* | (2008.01) | |
| *H04N 5/28* | (2006.01) | |
| *H04N 21/2187* | (2011.01) | |
| *H04N 21/239* | (2011.01) | |
| *H04W 64/00* | (2009.01) | |
| *H04W 88/04* | (2009.01) | |

(52) U.S. Cl.
 CPC ..... *H04N21/6131* (2013.01); *H04N 21/41407* (2013.01); *H04H 20/57* (2013.01); *H04N 5/28* (2013.01); *H04N 21/2187* (2013.01); *H04N 21/2393* (2013.01); *H04N 21/6125* (2013.01); *H04N 21/6175* (2013.01); *H04W 64/00* (2013.01); *H04W 88/04* (2013.01)

(56) References Cited

U.S. PATENT DOCUMENTS

| | | | |
|---|---|---|---|
| 7,562,049 B2 * | 7/2009 | Habaguchi | 705/40 |
| 7,917,130 B1 * | 3/2011 | Christensen et al. | 455/414.4 |
| 8,494,438 B2 * | 7/2013 | Jung et al. | 455/3.01 |
| 8,620,339 B2 * | 12/2013 | McCormick | 455/452.2 |
| 8,667,540 B2 * | 3/2014 | Hoshall | 725/53 |
| 9,020,532 B2 * | 4/2015 | Teplitsky | 455/456.3 |
| 2002/0041328 A1 * | 4/2002 | LeCompte et al. | 348/144 |
| 2002/0120555 A1 * | 8/2002 | Lerner | 705/37 |
| 2002/0188522 A1 | 12/2002 | McCall et al. | 705/26 |
| 2003/0069836 A1 * | 4/2003 | Penney et al. | 705/37 |
| 2003/0149653 A1 * | 8/2003 | Penney et al. | 705/37 |
| 2007/0011704 A1 * | 1/2007 | Anglin, Jr. | 725/46 |
| 2008/0271072 A1 * | 10/2008 | Rothschild et al. | 725/35 |
| 2009/0307143 A1 * | 12/2009 | Reistad et al. | 705/80 |
| 2009/0313653 A1 * | 12/2009 | Chien et al. | 725/32 |

\* cited by examiner

INTERFACING APPARATUS FOR TRANSMITTING MOVING IMAGE BETWEEN COMMUNICATION TERMINALS AND METHOD THEREOF

CROSS-REFERENCE TO RELATED APPLICATIONS

This application is a national phase application of PCT Application No. PCT/KR2011/001107, filed on Feb. 21, 2011, which claims the benefit and priority to Korean Patent Application No. 10-2010-0015551, filed Feb. 22, 2010. The entire disclosures of the applications identified in this paragraph are incorporated herein by references.

TECHNICAL FIELD

The following description relates to a moving picture relay technique, and more particularly, to an apparatus and method for relaying moving image information of a specific area, which is obtained by a communication terminal, to another communication terminal of a requester via a wired/wireless Internet network.

BACKGROUND ART

Generally, a situation of a specific remote location is identified by directly accessing the location or inquiring about information to those who are located near the site of the matter.

For example, if an accident has occurred at a certain site and a photography team of a broadcaster happens to be at the location, the scene of the accident is enabled to be shot directly and be reported in news bulletin by the broadcaster, but if the photography team is not present at the location, images of the accident are broadcasted generally by being provided from another broadcaster which takes pictures of the accident, or individuals who capture images or videos of the accident using their video-recordable mobile terminals. In this regard, since Korean broadcasters are not possible to directly take pictures of all news events occurring in overseas locations, they purchase news or photographs from Associated Press or Reuters and broadcast the purchased news or photographs in Korea. However, such purchased news is not worthy for use (for example, as an exclusive news) in a case in which real-time broadcast is required since an accident or event takes place momentarily.

Further, the above broadcasting method should pay a great amount for image information provided by broadcasting media, and thus there is limitation in providing such image information to individuals when they need.

DISCLOSURE OF INVENTION

Solution to Problem

Accordingly, an object of the present invention is to solve the problems described above. An apparatus and method for relaying moving images in real time using a communication terminal are provided. The apparatus is configured to connect, in real time, the communication terminal having functions of global positioning system, shooting moving images, and data transmission through access to wireless Internet networks, a relay server on the Internet, and a terminal of an information requester which accesses the relay server. Accordingly, while received location information of the communication terminal of the information provider is being displayed on a map, moving image information of a specific area is transmitted, in real time, to the terminal of the information requester in response to a request from the information requester. Thus, personal users or business users can obtain real-time information about any part of the world at low cost.

In one general aspect, there is provided an apparatus for relaying moving image in real time using a communication terminal, the apparatus including: the communication terminal of an information provider, configured to have functions of global positioning system, shooting moving images, and data transmission by accessing wireless Internet networks; a terminal of an information requester, configured to request moving images shot by the communication terminal of the information provider and receive moving image information on the shot moving images; and a relay server configured to provide a transmission program to the communication terminal of the information provider so as to track a location of the communication terminal and allow the information provider to transmit the moving image information in real time, and to control and guide, in real time, transmission of the moving image information between the communication terminal of the information provider and the terminal of the information requester.

The relay server may be further configured to comprise an information analyzing unit configured to set up a home page accessible to Internet and analyze pieces of information transmitted from the communication terminal of the information provider and the terminal of the information requester, a location tracking processing unit configured to track a location of the communication terminal of the information provider based on the information analyzed by the information analyzing unit, a map processing unit configured to display the location of the communication terminal of the information provider, which is tracked by the location tracking processing unit, on a web map of the home page, a transmission/reception processing unit configured to control transmission and reception of the moving information transmitted from the communication terminal of the information provider and a request for the moving image information from the terminal of the information requester based on the information analyzed by the information analyzing unit, a settlement processing unit configured to settle an amount for the real-time provision of the moving image information from the communication terminal of the information provider to the terminal of the information requester, and a database configured to store and manage the information analyzed by the information analyzing unit and the moving image information transmitted from the communication terminal of the information provider.

The communication terminal of the information provider may be a smartphone.

The terminal of the information requester may be one of a notebook computer, a desktop computer and a smartphone which can display moving images and perform data communication by accessing a wired/wireless Internet network.

In another general aspect, there is provided a method of relaying moving images using communication terminals of information providers, a terminal of an information requester and a relay server, the method including: displaying locations of the communication terminals of the information providers on a web map provided by the relay server; receiving from the information requester a specific area selected based on information on the locations displayed on the web map provided by the relay server and an offered price for moving image information; transmitting the offered price to the communication terminals of the information providers and receiving acknowledgement of the provision of the moving image information on moving images shot in real time by the communication terminals of the information providers; issuing a request for provision of moving image information to a communication terminal selected from the communication terminals of the information providers which acknowledge the provision of the moving image information; receiving, in real time, the moving image information from the selected information provider and transmitting the receiving moving image information to the terminal of the information requester in real time; and settling payment for the provision of the moving image information between the information provider, the information requester, and the relay server.

The transmitting of the offered price and the receiving of the acknowledgement may further include receiving a price amended by the information provider when the offered price from the information requester is not acceptable, and issuing a request to the information requester to determine whether to accept the amended price, and if the information requester accepts the amended price, transmitting the amended price to the information requester, and receiving the acknowledgement of the provision of the moving image information.

The communication terminal of the information provider may be a terminal having functions of global positioning system (GPS), shooting moving images, and data transmission by accessing wireless Internet networks;

The communication terminal may be a smartphone. The communication terminal of the information provider may download a transmission program from the relay server to allow real-time transmission of a current location and the moving image information to the relay server and install the downloaded transmission program therein.

The terminal of the information requester may be one of a notebook computer, a desktop computer and a smartphone which can display moving images and perform data communication by accessing a wired/wireless Internet network.

The settling of the payment may further include calculating an amount to be paid to the information provider of the communication terminal in association with a real-time transmission time for which the moving image information is provided by the communication terminal.

Advantageous Effects of Invention

As such, the apparatus is configured to connect, in real time, the communication terminal having functions of global positioning system, shooting moving images, and data transmission through access to wireless Internet networks, a relay server on the Internet, and a terminal of an information requester which accesses the relay server. Accordingly, while received location information of the communication terminal of the information provider is being displayed on a map, moving image information of a specific area is transmitted, in real time, to the terminal of the information requester in response to a request from the information requester. Thus, personal users or business users can obtain real-time information about any part of the world at low cost.

Moreover, by providing moving images in real time to the information requester who is in a remote area at low cost, the information requester can reduce the expense, the information provider who has the communication terminal can have extra income, and a developer of the relay server can earn relay service charge, and thus a win-win profit sharing structure can be realized for those who are involving in transmitting the moving images.

MODE FOR THE INVENTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
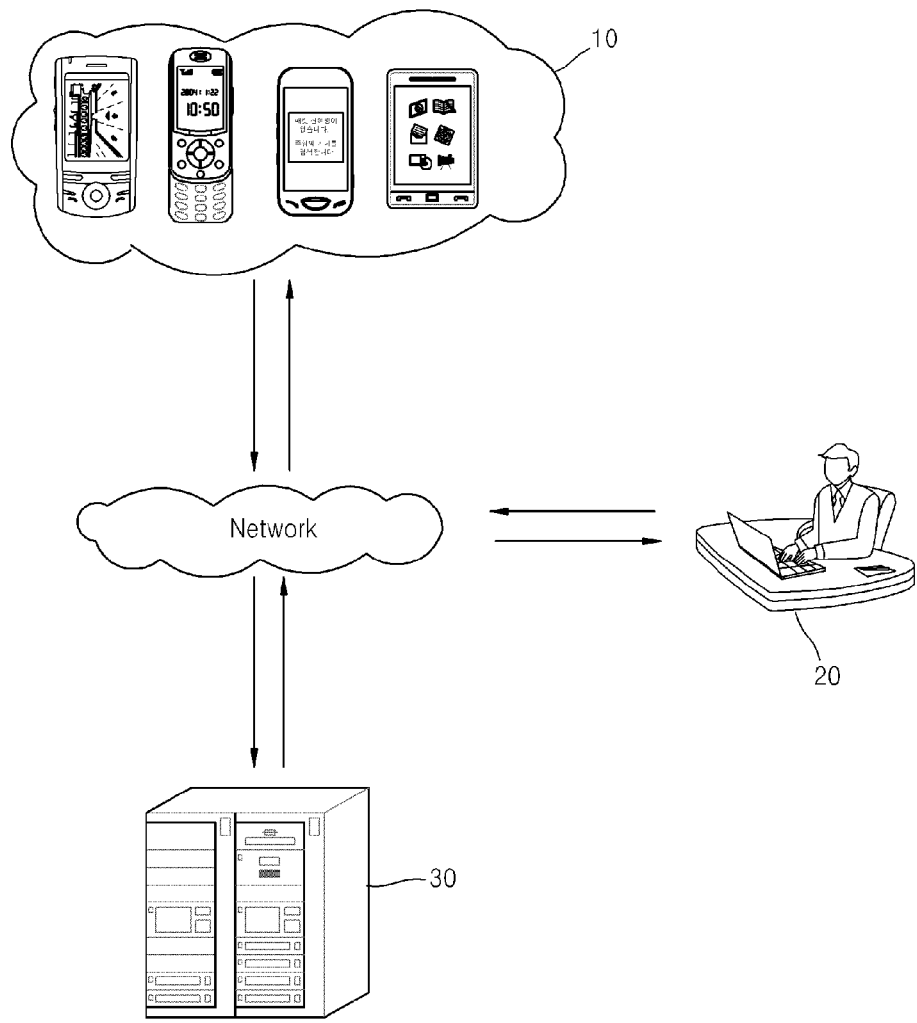
FIG. 1 is a diagram illustrating an example of an apparatus for relaying moving images in real time using a communication terminal.
Figure 2:
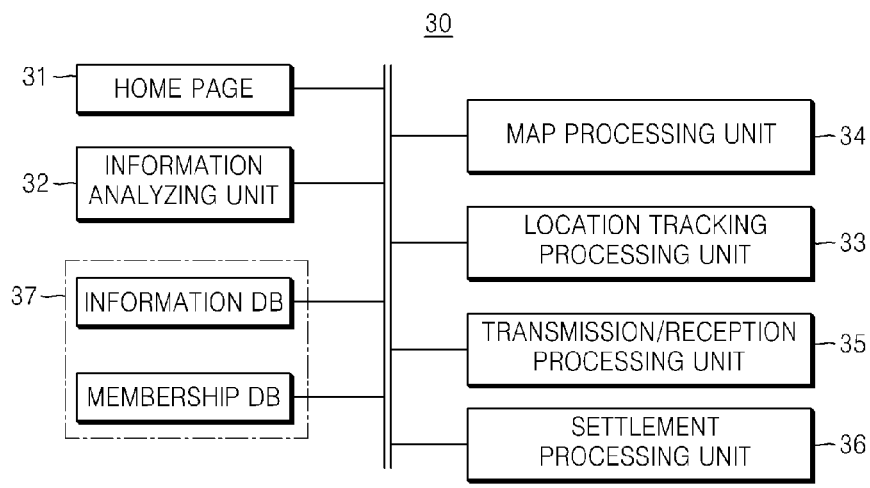
FIG. 2 is a diagram illustrating an example of a configuration of a relay server.
Figure 3:
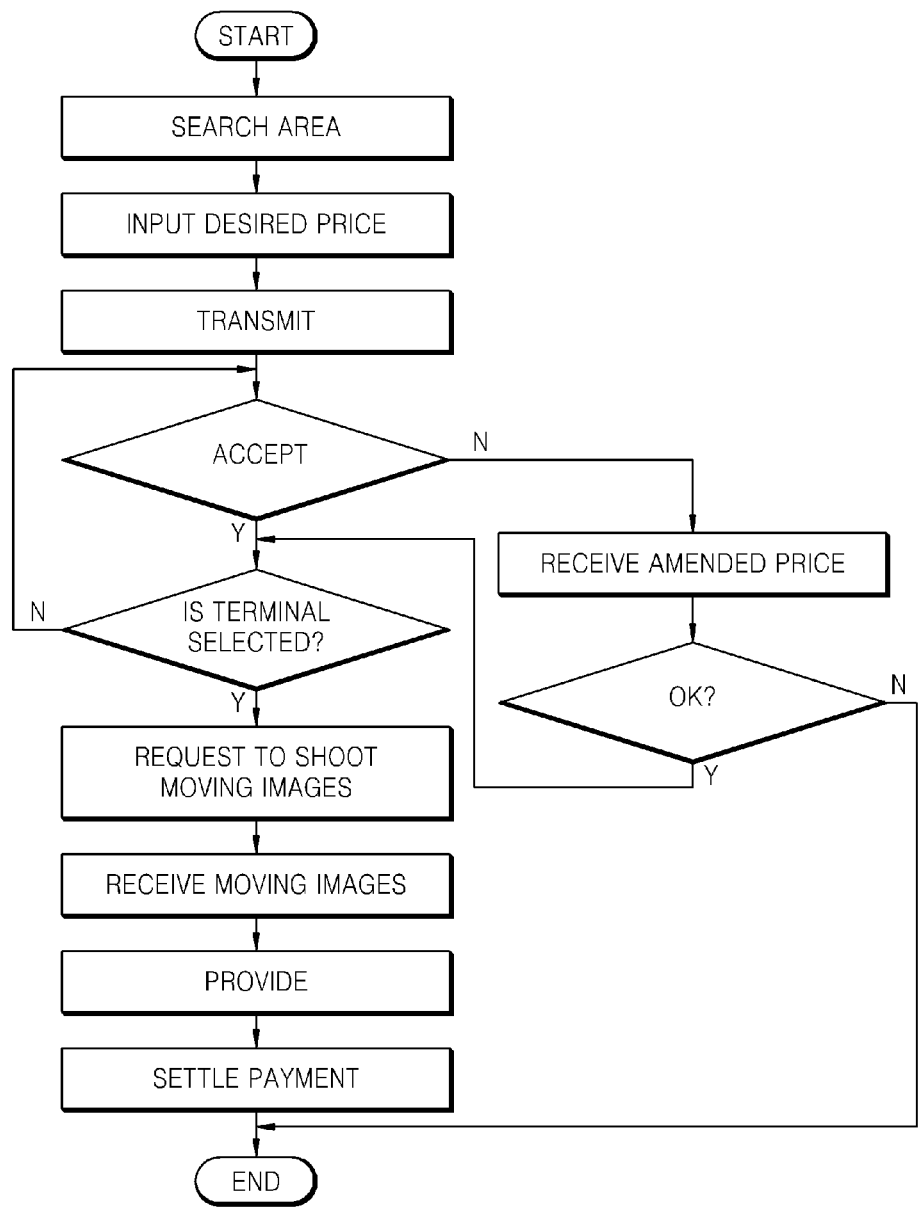
FIG. 3 is a flowchart illustrating an example of a method of relaying moving images in real time using a communication terminal.

FIG. 1 illustrates an example of an apparatus for relaying moving images in real time using a communication terminal, and FIG. 2 illustrates an example of a configuration of a relay server.

Referring to the examples illustrated in FIGS. 1 and 2, the real-time moving image relaying apparatus may include a communication terminal 10 of an information provider, a terminal 20 of an information requester, and the relay server 30 that sets up a home page 31.

The communication terminal 10 of the information provider may be a smart phone having functions of global positioning system (GPS), video recording, and data communication by accessing wireless Internet networks.

The terminal 20 of the information requester may request to transmit moving images taken by the communication terminal 10 of the information provider and accordingly receive the moving images in real time, and may be one of a notebook computer, a desktop computer, and a smart phone, which enables to display moving images and perform data communication by accessing wired/wireless networks.

The relay server 30, which provides the communication terminal 10 of the information provider with a transmission program which allows tracking of the location of the communication terminal 10 and transmitting of moving image information in real time, may control and guide, in real time, the transmission of the moving images between the communication terminal 10 of the information provider and the terminal 20 of the information requester. The relay server 30 may include an information analyzing unit 32, a location tracking processing unit 33, a map processing unit 34, a transmission/reception processing unit 35, a settlement processing unit 36, and a database 37.

The information analyzing unit 32 may analyze pieces of information (for example, information on moving images, a request signal, identification information of the communication terminal of the information provider, account information of the information provider and the information requester). The location tracking processing unit 33 may be configured to track a location of the communication terminal 10 of the information provider based on the information analyzed by the information analyzing unit 32.

The map processing unit 34 may be configured to display the location of the communication terminal 10 of the information provider which is tracked by the location tracking processing unit 33 on an web map.

The transmission/reception processing unit 35 may control the transmission and reception of the information on moving images to be transmitted through the communication terminal 10 of the information provider and a request of the terminal 20 of the information requester for the information on moving images based on the analysis information analyzed by the information analyzing unit 32.

The settlement processing unit 36 may settle a charge for providing the moving image information in real time to the terminal 20 of the information requester from the communication terminal 10 of the information provider.

That is, when the information requester receives the moving image information in response to the request, and pays for the information, the settlement processing unit 36 may enable a certain amount of fee, calculated by subtracting relay service charge from the paid amount, to be paid to the information provider.

The database 37 may store and manage the analysis information analyzed by the information analyzing unit 32 and the moving image information transmitted through the communication terminal 10 of the information provider. In addition, the database 37 may be configured to further store and manage the information on the communication terminal 10 of the information provider and the terminal 20 of the information requester, and information on the information provider and requester.

The application of real-time transmission of moving images through a communication terminal will be described with reference to FIGS. 1 to 4.

First, the communication terminal 10 of the information provider may receive a transmission program provided by the relay server 30 and install the downloaded transmission program.

In this case, the download of the transmission program may be carried out by the information provider accessing the home page 31 of the relay server 30 by use of the communication terminal 10 or a notebook or desktop computer and joining membership of the home page 31.

Then, the communication terminal 10 of the information provider may periodically transmit its location, in real-time, to the relay server 30 through the installed transmission program, and accordingly, the information analyzing unit 32 of the relay server 30 may analyze the location and provide the analyzed information to the location tracking processing unit 33. The location tracking processing unit 33 may track the location of the communication terminal 10 of the information provider based on the analysis information of the information analyzing unit 32 and provide the tracking information to the map processing unit 34.

Thereafter, the map processing unit 34 may enable to display the location of the communication terminal 10 tracked by the location tracking processing unit 33 on a web map of the home page 31.

In the meantime, with the location of the communication terminal 10 of the information provider being displayed on the home page 31 of the relay server 30, the information requester who is willing to obtain information on moving images of a specific area may access the home page 31 of the relay server 30 through the terminal 20.

Then, the information requester may confirm whether communication terminals 10 of information providers are present in the specific area on the web map of the home page 31, and offer desired price for the information on moving images to the relay server 30 through the terminal 20.

Accordingly, the relay server 30 may transmit the amount offered by the information requester to the communication terminals 10 of the information providers who are located in the specific area, and the information providers may check the offered amount and determine whether to transmit the moving images or not.

If the information providers are not satisfied with the amount offered by the information requester, the information providers may transmit an amended price to be charged to the relay server 30 through the communication terminal 10, and as a result, the relay server 30 may transmit the amended price information to the terminal 20 of the information requester.

In response, the terminal 20 of the information requester may check the amended price from the information providers and if the amount is acceptable, the information requester may transmit an acceptance response to the communication terminal 10 of the information provider via the relay server 30.

Therefore, in a case in which, by the above transmission and reception procedures, a negotiated price for the provision of the moving image is acceptable to both the information provider and the information requester, the information provider may transmit the moving images in real time to the relay server 30 through the communication terminal 10 once the moving images of the specific area starts being shot. Although the information provided by the information provider is referred to as moving image information in the above examples, the information may not be limited thereto, and the information may include any types of information which can be transmitted, for example, image files and document data information.

The relay server 30 may transmit the received moving image information, in real time, to the terminal 20 of the information requester, so that the information requester can check the moving images of the desired specific area by use of the terminal 20, and in payment for the moving image information, the information requester may pay the relay server 30 by means of bank transfer or the like.

In this case, the settlement processing unit 36 of the relay server 30 may pay an amount, calculated by subtracting relay service charge from the payment of the information requester, to the information provider, and examples of a payment method include bank transfer.

Figure 4:
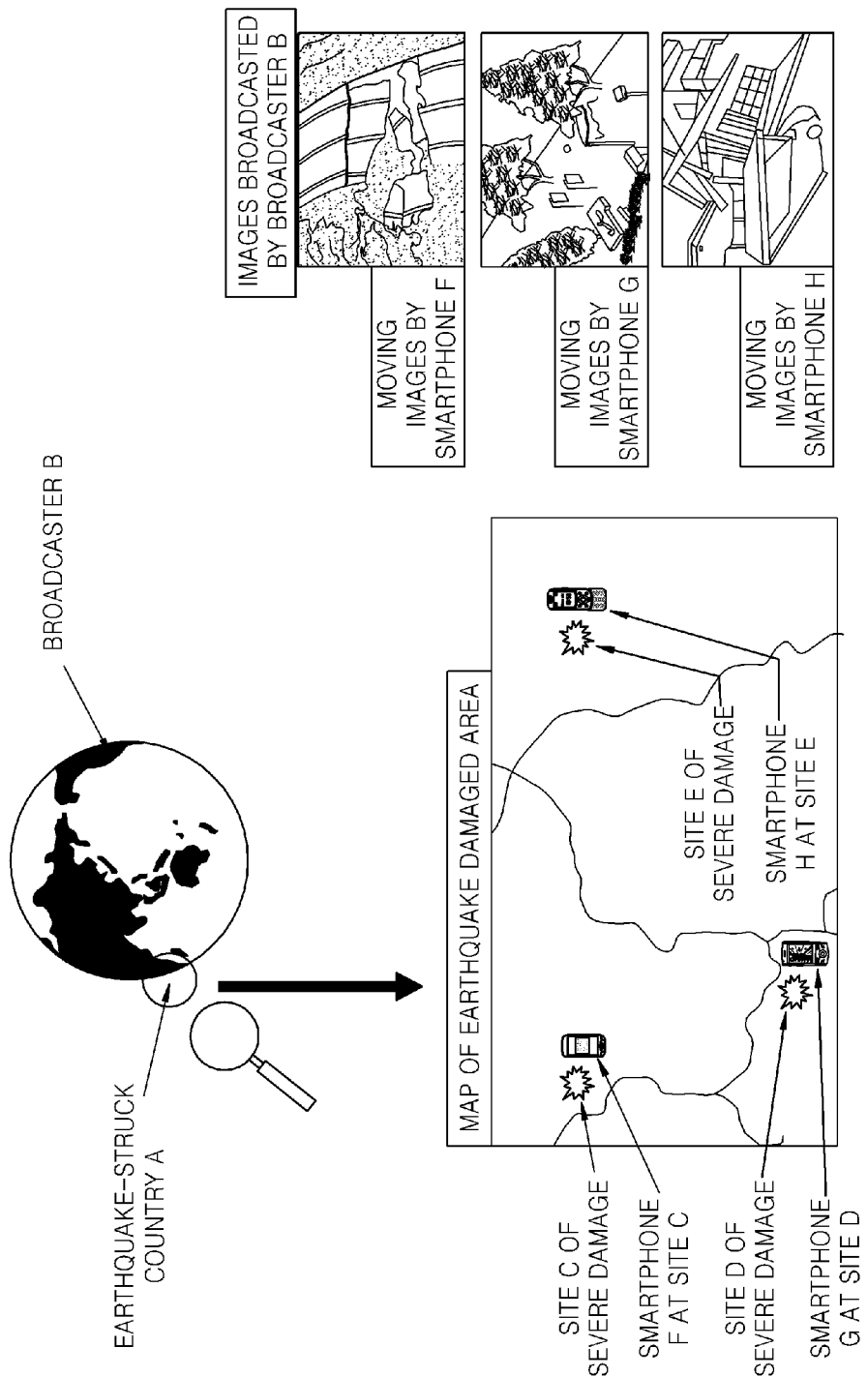
FIG. 4 is a diagram illustrating an example of real-time relay of moving images using communication terminals.

As one example with reference to FIG. 4, a local broadcaster B that is informed of the occurrence of an earthquake of great magnitude on opposite side of the world, a country A, may access the home page 31 of the relay server 30, check smartphones which are the communication terminals 10 of information providers who are located in the area, and offer an amount of $10 per minute to the communication terminals 10, which are, respectively, located at primary sites C, D, and E in the earthquake area so as to provide follow-up reports along with real-time moving images.

Then, a smartphone F at the site C may be selected with the amount of $10 per minute, a smartphone G at the site D may be selected with the amount of $15 per minute, and a smartphone H at the site E may be selected with the amount of $20 per minute, according to proper procedures.

Thereafter, the selected smartphones F, G, and H which are the communication terminals 10 of information providers start shooting moving images, and the information requester, the broadcaster B, is then enabled to broadcast in real time by connecting the terminal 20 which is broadcasting equipment with the smartphones that are the communication terminals 10 located at sites in the earthquake area.

As an example, in a case in which the moving images are taken for 20 minutes, the broadcaster B as the information requester may pay an amount of $900 (=$10×20+$15×20+$20×20) to the relay server 30, and the relay server 30 may pay an amount calculated by subtracting relay service charge, 40% of the total paid amount, from the paid amount of $900 to the information providers of the communication terminals 10, the smartphones F, G, and H.

Specifically, the user of the smartphone F may be paid $120 (=$10×20×0.6), the user of the smartphone G may be paid $180 (=$15×20×0.6), and the user of the smartphone H may be paid $240 (=$20×20×0.6).

As a result, the information requester, the broadcaster B, which has been conventionally wait for a local broadcaster of the area to provide images and paid a great amount for the moving images to be broadcasted, may be allowed to broadcast desired images in real time at a low cost, the users of the smartphones F, G, and H, who are the information providers, may earn, respectively, incomes of $120, $180, and $240, and the relay server 30 may obtain the relay service charge of $360, and thus those who are involving in providing the moving images can obtain benefits.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of relaying moving images using communication terminals of information providers, a terminal of an information requester and a relay server, the method comprising:
   displaying locations of the communication terminals of the information providers on a web map provided by the relay server;
   receiving from the information requester a specific area selected based on information on the locations displayed on the web map provided by the relay server and an offered price for moving image information;
   transmitting the offered price to the communication terminals of the information providers and receiving acknowledgement of the provision of the moving image information on moving images shot in real time by the communication terminals of the information providers;
   issuing a request for provision of moving image information to a communication terminal selected from the communication terminals of the information providers which acknowledge the provision of the moving image information;
   receiving, in real time, the moving image information from the selected information provider and transmitting the received moving image information to the terminal of the information requester in real time; and
   settling payment for the provision of the moving image information between the information provider, the information requester and the relay server,
   wherein the transmitting of the offered price and the receiving of the acknowledgement further comprises
   receiving a price amended by the information provider when the offered price from the information requester is not acceptable, and
   issuing a request to the information requester to determine whether to accept the amended price, and if the information requester accepts the amended price, transmitting the amended price to the information requester, and receiving the acknowledgement of the provision of the moving image information.

2. The method of claim 1, wherein the communication terminal of the information provider is a terminal having functions of global positioning system (GPS), shooting moving images, and data transmission by accessing wireless Internet networks.

3. The method of claim 2, wherein the communication terminal is a smartphone.

4. The method of claim 2, wherein the communication terminal of the information provider downloads a transmission program from the relay server to allow real-time transmission of a current location and the moving image information to the relay server and installs the downloaded transmission program therein.

5. The method of claim 1, wherein the terminal of the information requester is one of a notebook computer, a desktop computer and a smartphone which can display moving images and perform data communication by accessing a wired/wireless Internet network.

6. The method of claim 1, wherein the settling of the payment further comprises calculating an amount to be paid to the information provider of the communication terminal in association with a real-time transmission time for which the moving image information is provided by the communication terminal.

* * * * *